United States Patent [19]

Amari

[11] 4,007,484
[45] Feb. 8, 1977

[54] MAGNETIC RECORDING AND/OR REPRODUCING APPARATUS WITH CHROMINANCE CROSSTALK ELIMINATION

[75] Inventor: Shinji Amari, Hooya, Japan
[73] Assignee: Sony Corporation, Tokyo, Japan
[22] Filed: Dec. 23, 1975
[21] Appl. No.: 643,639

Related U.S. Application Data

[63] Continuation-in-part of Ser. No. 634,668, Nov. 24, 1975, which is a continuation of Ser. No. 492,330, July 26, 1974.

[30] Foreign Application Priority Data

July 31, 1973 Japan .............................. 48-86111
Aug. 18, 1973 Japan .............................. 48-92699

[52] U.S. Cl. ........................................ 358/8; 358/4
[51] Int. Cl.$^2$ ......................................... H04N 5/79
[58] Field of Search .................................. 358/4, 8

[56] References Cited

UNITED STATES PATENTS

| | | | |
|---|---|---|---|
| 3,813,484 | 5/1974 | Mino et al. ........................ | 358/4 X |
| 3,846,819 | 11/1974 | Warren ............................. | 358/4 X |
| 3,918,085 | 11/1975 | Numakura ........................... | 358/4 |

FOREIGN PATENTS OR APPLICATIONS

1,276,161   6/1972   United Kingdom .................... 358/4

*Primary Examiner*—Robert L. Griffin
*Assistant Examiner*—Mitchell Saffian
*Attorney, Agent, or Firm*—Lewis H. Eslinger; Alvin Sinderbrand

[57] ABSTRACT

A plurality of transducers are rotated or otherwise moved in respect to a record medium so as to be successively operatively positioned relative to the latter in a repeating cyclic order for recording and/or reproducing video signals in successive parallel tracks on the record medium. Interference or cross-talk between signals recorded in adjacent tracks is reduced or eliminated during reproduction by recording the chrominance signal components of the video signals with different first and second carriers in the adjacent tracks, respectively. Pulse signals are produced upon the operative positioning of each of the transducers, and the first and second carriers are selected for recording of the chrominance signal components in the tracks which are next adjacent each other in response to every other one of the pulse signals. Further, vertical synchronizing signals are separated from the signals being recorded and control signals are derived therefrom for recording on the record medium at every other track, with the movement of the transducers being controlled in response to comparison of such control signals with every other one of the pulse signals. On reproducing, the movement of the transducers is controlled in response to comparison of the reproduced control signals with every other one of the pulse signals, and the chrominance signal components separated from the video signals reproduced from adjacent tracks are restored to a common carrier under the control of the pulse signals and of horizontal synchronizing signals separated from the reproduced video signals.

25 Claims, 7 Drawing Figures

MAGNETIC RECORDING AND/OR REPRODUCING APPARATUS WITH CHROMINANCE CROSSTALK ELIMINATION

CROSS-REFERENCES TO RELATED APPLICATIONS

This application is a continuation-in-part of U.S. Pat. Application Ser. No. 634,668 filed Nov. 24, 1975, which is, in turn, a continuation of U.S. Pat. Application Ser. No. 492,330, filed July 26, 1974.

BACKGROUND OF THE INVENTION

1. Field of the Invention

This invention relates generally to the recording and reproduction of information signals, such as, for example, color video signals, and more particularly is directed to the reduction of cross-talk in the reproduction of signals recorded in adjacent tracks, even though the relatively low frequency chrominance signal of color video signals are recorded for every line interval and the tracks are very close together, or even may be overlapping.

2. The Prior Art

It is well known to record video signals on magnetic tape or other forms of record medium by scanning successive parallel tracks on the record medium with one or more transducers energized by the video signals. There has been a constant effort to improve the efficiency of use of the record medium by packing the tracks as close together as possible. The packing density has always been limited by, among other things, the fact that, during reproduction of the recorded signals, a reproducing transducer scanning each of the tracks in order could pick up signals or cross-talk from adjacent tracks.

One effort made to minimize cross-talk has been to use two transducers having air gaps with different azimuth angles for successive tracks. This is relatively easy to do because most magnetic recording apparatus for video signals includes a rotary drum provided with two transducers or heads which can have gaps with different azimuth angles. The tape is wrapped helically about a portion of the perimeter of the drum and moved longitudinally along this helical path while the transducers or heads are rotated, thus bringing the heads alternately into operative or recording relationship with the tape and allowing each head to trace out a respective one of the tracks. Each transducer or head has a finite width and thus produces magnetization of those magnetic domains in the material on the tape in what would appear to be, if such domains were visible, a series of parallel lines or stripes, each having a length as great as the width of the track, and each having an orientation that corresponds to the azimuth angle of the gap of the transducer or head used to record that track.

By recording successive alternate tracks with transducers or heads having different azimuth angles, and in view of the fact that the reproducing transducers or heads would also have corresponding azimuth angles, the gap of the reproducing transducers or heads would be aligned with the parallel, but fictitious, lines of the track being scanned thereby, but, because of the difference in azimuth angles, would extend at an angle to such lines of the next adjacent track. If the reproducing transducer overlapped that adjacent track, the well-known azimuth loss would result in attenuation of the signal reproduced from the adjacent track. Even if the reproducing transducer accurately scans a track recorded with the same azimuth, the reproducing transducer may still be influenced by the signals recorded in adjacent tracks with different azimuths, but the azimuth loss will decrease or eliminate the effect of such signals recorded in adjacent tracks on the output signal of the transducer.

Even in the above type of recording with different azimuth angles, there is still a limit to the overlapping or abutting of adjacent tracks. This is due in part to the fact that some of the recorded information may include relatively low frequencies, and the azimuth loss is generally proportional to the frequency of the signals. Thus, interference due to cross-talk from low frequency signals, such as, a frequency converted chrominance signal component, is not reduced to the same degree by the use of transducers having different azimuth angles as cross-talk from high frequency signals, such as, a frequency modulated luminance signal component.

A proposal for minimizing cross-talk of low frequency information is disclosed in U.S. Pat. No. 3,821,787 which is assigned to the assignee of the present application. In some embodiments of that patent, the relatively high frequency luminance components are recorded during every line area increment on every track, but the low frequency chrominance components are not recorded in adjacent line increment areas of adjacent tracks, that is, the chrominance components are recorded only intermittently. If this type of recording were visible, the chrominance components would appear to be recorded in a checkerboard-like pattern. Furthermore, the luminance components could also be recorded intermittently in this same way to permit even further overlapping of adjacent tracks.

In the reproduction of signals recorded with this checkerboard-like pattern, the components that were recorded only intermittently are utilized directly upon reproduction and are also delayed for the length of time necessary to permit them to be used during the next succeeding interval in which similar information is not recorded. This system reduces the cross-talk interference but at some sacrifice in the quality of the reproduced image, due to the fact that less than all of the available information is recorded.

OBJECTS AND SUMMARY OF THE INVENTION

Accordingly, it is an object of this invention to provide an improved apparatus for recording and/or reproducing periodic information signals, such as, video signals having luminance and chrominance components, in successive parallel tracks on a record medium, and in which such tracks can be abutting or even overlapping, that is, not provided with guard bands therebetween, for optimum utilization of the record medium, and further in which the signals reproduced from each of the record tracks are of good resolution or quality and cross-talk from adjacent tracks is reduced or eliminated.

A more specific object of the invention is to provide an improved color video signal recording and/or reproducing system, as aforesaid, in which both luminance and chrominance components of the color video signal can be recorded in adjacent tracks during every line interval, but in such a way that the cross-talk interference of the low frequency components is inherently minimized or can be minimized by simple signal processing.

In a particular embodiment of this invention, periodic information signals having first intervals and second intervals which are subdivisions of the first intervals, for example, color video signals having field and line intervals, are recorded in respective areas of successive parallel tracks on a record medium, and interference or cross-talk between signals recorded in adjacent tracks is reduced or eliminated during reproduction by recording the chrominance signal components with different first and second carriers in the adjacent tracks, respectively. Such first and second carriers modulated by signals recorded in adjacent tracks, respectively, may be distinguished from each other by their respective polarity characteristics so that, upon reproduction of the signals recorded in a particular track, the cross-talk signals from the tracks next adjacent thereto can be conveniently suppressed or eliminated by reason of the different polarity characteristics of the carriers with which the signals were recorded in that particular track and in the next adjacent tracks, respectively. In any case, when recording color video signals in accordance with this invention, both the chrominance and luminance components are recorded as continuous signals, the word "continuous" being used in the sense that the blanking portion of each line interval is part of the continuous signal.

Another specific object of this invention is to provide an apparatus for recording and/or reproducing video signals, as aforesaid, with devices for controlling the movements of recording and/or reproducing transducers or heads in respect to the record medium, for controlling the selection of the first and second carriers with which the chrominance signal components are recorded in next adjacent tracks, and for controlling the operation of a signal processor by which the chrominance signal components of video signals reproduced from each track are provided with a common carrier while suppressing the chrominance signal components of cross-talk signals from next adjacent tracks.

In accordance with an aspect of this invention, pulse signals are produced upon the operative positioning of each of a plurality of recording and/or reproducing heads or transducers in respect to the record medium, and the first and second carriers are selected for recording of the chrominance signal components in the tracks which are next adjacent each other in response to every other one of the pulse signals. Further, vertical synchronizing signals are separated from the signals being recorded and control signals are derived therefrom for recording on the record medium at every other track, with the movement of the transducers being controlled in response to comparison of such control signals with every other one of the pulse signals. On reproducing, the movement of the transducers is controlled in response to comparison of the reproduced control signals with every other one of the pulse signals, and the chrominance signal components separated from the video signals reproduced from adjacent tracks are restored to a common carrier under the control of the pulse signals and of horizontal synchronizing signals separated from the reproduced video signals.

The above and other objects, features and advantages of the invention will be apparent in the following detailed description of an illustrative embodiment which is to be read in connection with the accompanying drawings.

DETAILED DESCRIPTION OF A PREFERRED EMBODIMENT OF THE INVENTION

Figure 1:
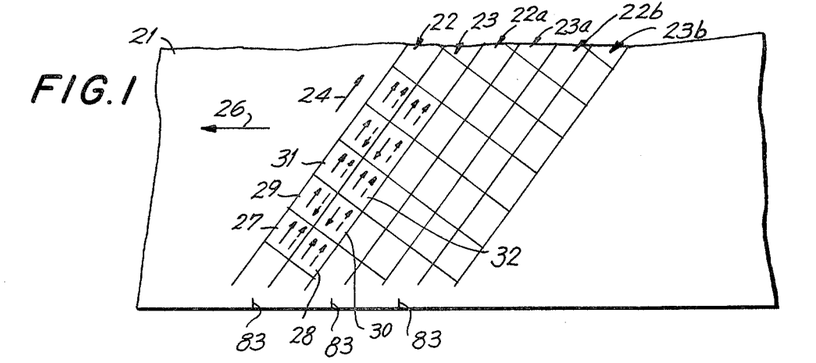
FIG. 1 shows a fragment of a record medium illustrating portions of two tracks in which signal information has been recorded in accordance with this invention.

FIG. 1 shows a section of a record medium 21 on which there are tracks 22, 23, 22a, 23a, 22b and 23b recorded in that order due to relative movement in the directions of the arrows 24 and 26 between the medium 21 and recording transducers (not shown). Only six tracks are shown, however, in the normal recording of signal information there would be a large number of such tracks. Each track is divided into areas or increments of which the increments 27–32 are illustrative. Each of these areas or increments has recorded on it the signal information of one interval, for example, a line interval of a video signal that is divided into line intervals and field intervals. Usually, but not necessarily, each track 22 and 23 includes a line increment for each line interval of one field of the television signal.

Each line interval and each field interval contains a blanking and synchronizing portion, and in accordance with accepted practice, the tracks 22 and 23 are shown with the increments 27–32, as well as all of the other increments, arranged in a pattern referred to as H-alignment. This is achieved by regulating the relative movements along the directions 24 and 26 in accordance with the synchronizing portions of the video signal to be recorded so that the section of the increment or area 27, for example, on which the blanking and synchronizing signal is recorded in the track 22 is aligned with the section of the abutting increment or area 28 on which the blanking and synchronizing signal for that line interval is recorded. This reduces the cross-talk of blanking and synchronizing signal information from one track to the other.

The tracks 22, 23, 22a, 23a, 22b, and 23b in FIG. 1 are shown recorded in such a way that they are contiguous, that is, without guard bands therebetween. It is assumed that the width of each of the transducers (not shown) used to record the tracks is exactly equal to the width of the respective track 22 or 23. Signals recorded on contiguous tracks as shown in FIG. 1 would produce cross-talk interference from one track to the other during reproduction or playback, because the reproducing transducer (not shown) scanning track 22 would unavoidably be energized slightly by the magnetic field of the adjacent edge of the track 23.

In accordance with accepted practice, the luminance components of a color video signal can be treated separately from the chrominance components. More specifically, the luminance components modulate a carrier so that they are recorded in a higher frequency portion of the available frequency band. If the tracks 22 and 23 are then recorded by respective transducers having different azimuth angles of their respective gaps, as hereinafter described, and the same azimuth angles are used in transducers respectively reproducing video information recorded in tracks 22 and 23, then the well-known azimuth loss would result in attenuation of the signal reproduced from track 23 during the scanning of track 22. However, the chrominance signal components, in accordance with well-known practice, are frequency converted from a band around the normal chrominance carrier frequency, which in the case of the NTSC signal is approximately 3.58MHz, to a relatively low frequency of about 600 or 700KHz. Since the azimuth loss is generally proportional to the frequency of the signals, the interference due to crosstalk from low-frequency signals, such as the frequency-converted chrominance signal components, is not reduced to the same degree, by the use of transducers having different azimuth angles, as is cross-talk from high frequency signals, such as the frequency-modulated luminance signal components. Thus, even if transducers having different azimuth angles are used for the recording of tracks 22 and 23 on FIG. 1, and then for the reproducing of the recorded signals, chrominance information recorded in the area or increment 28 of track 23 would be picked up by the transducer traversing the area or increment 27 when scanning track 22 and would interfere with the chrominance signal reproduced from the area or increment 27. The reverse would also be true.

Figure 2:
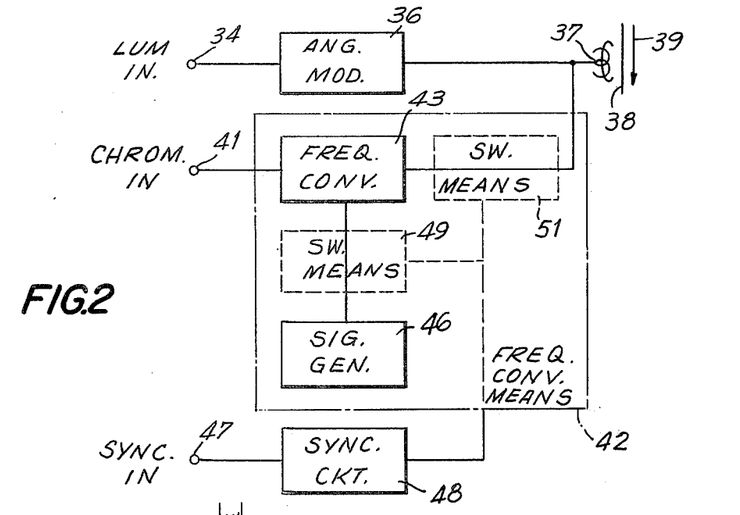
FIG. 2 is a block diagram of basic components of a recording apparatus according to this invention for minimizing cross-talk interference between frequency converted chrominance signal components of a video signal.

FIG. 2 schematically shows basic components of a circuit in accordance with the present invention to permit successive tracks, such as the tracks 22 and 23 in FIG. 1, to be recorded and to include in every line area or increment of each track both luminance information and chrominance information. The luminance signal is supplied from an input terminal 34 to an angular modulator 36 in which it modulates the phase or frequency of a carrier signal produced within the angular modulator 36. This angular modulated signal is connected to a transducer 37 for recording by the latter on a record medium 38. There is relative movement between the transducer 37 and the medium 38 which may be resolved into movement of the medium along the direction of the arrow 39.

Chrominance components of the video signal corresponding to the luminance components applied to the input terminal 34 are applied to an input terminal 41. This input terminal is connected to frequency conversion means 42 that includes a frequency converter 43, and the output of which is supplied to the transducer 37. In accordance with the usual practice, the chrominance components include a carrier originally having a frequency in the upper part of the video signal band. The chrominance components are clustered around this carrier at frequencies such as to interleave with components in the same part of the frequency band of the original luminance components applied to the input terminal 34. The frequency conversion means 42 is shown generally to include a signal generator 46 that produces either one or two frequency converting signals, depending upon the mode of operation of the system. The frequency converting signal or signals is or are applied to the frequency converter 43 to shift the carrier of the chrominance components to a relatively low frequency band below the band of frequencies occupied by the modulated carrier from the angular modulator 36.

The basic system further includes a synchronizing signal input terminal 47 and a synchronizing circuit 48 to receive synchronizing signals synchronous with selected synchronizing signals of the video signal to be recorded. The synchronizing circuit is connected to switching or selecting circuit means 49 or 51, which are alternatively provided according to embodiments of the invention hereinafter described. Either the switching circuit means 49 is used to control the converting signal input to the frequency converter 43 or the switching circuit means 51 is used to select the output signal of the frequency converter in the frequency conversion means 42. In one mode of operation, the signal generator 46 produces two frequency converting signals of different frequency, and the switching means 49 is used to apply one or the other of these two signals, alternately, to the frequency converter 43 to convert the chrominance components to one or the other of two frequency bands. In the case of a system utilizing two different converting frequencies, the frequency-converted chrominance signals recorded on tracks 22, 22a, 22b...etc. in FIG. 1 would have one carrier frequency, and the frequencyconverted chrominance signals recorded on tracks 23, 23a, 23b...etc. would have another carrier frequency. Not only would these carrier frequencies be different from each other but they would be selected to interleave with each other and with the chrominance and luminance components, or at least with the frequencies that those components would occupy if the components were present.

On the other hand, if the system is used in such a way that the signal generator 46 produces only a single frequency converting signal, the frequency converter 43 may be arranged to provide two output signals to the switching means 51, one of these output signals being out of phase, or, more correctly, of inverse polarity, to the other, as hereinafter described in detail. In that case, the signal from the synchronizing circuit 48 controls the switching means 51 to select one or the other of these frequency converted signals of opposite polarity and to apply the selected frequency converted signal to the transducer 37 for recording by the latter. The selection of one or the other of these frequency converted signals would produce a pattern of recording, although not a visible pattern, of the chrominance components in the increments in the tracks 22 and 23. A pattern suitable for minimizing cross-talk between contiguous increments such as the increments 27 and 28 in the tracks 22 and 23 will be described in greater detail hereinafter.

Figure 3:
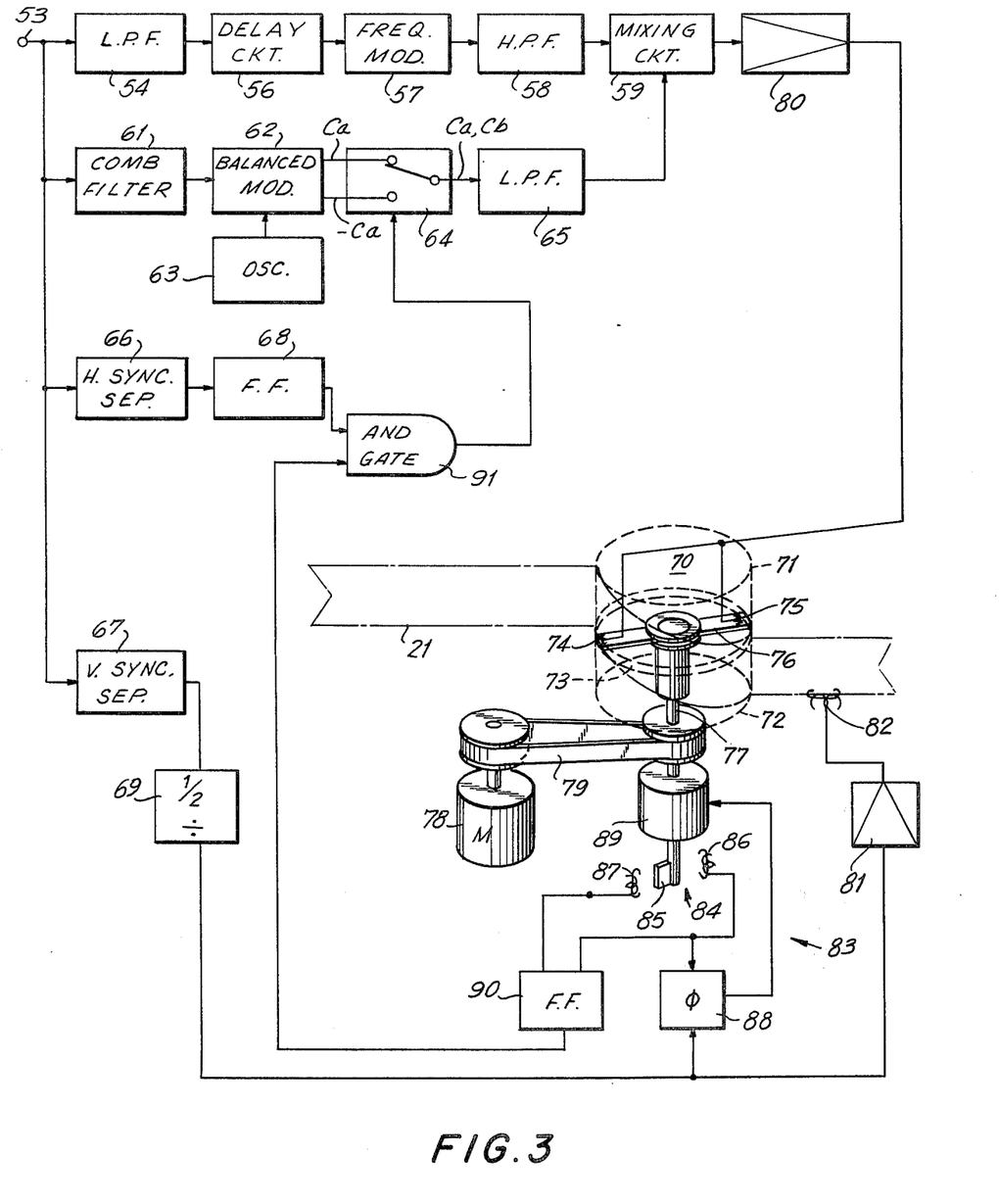
FIG. 3 is a block diagram of a recording apparatus embodying one of the modes of operation suggested in FIG. 2.

In the more detailed illustration in FIG. 3 of a video tape recording system in accordance with an embodiment of the present invention, a color video signal input terminal 53 is provided to receive a composite video signal that includes both luminance and chrominance components and is composed of line, field, and frame intervals with blanking and synchronizing portions in each of those intervals. A low pass filter 54 connects the input terminal 53 to a delay circuit 56 that, in turn, supplies a signal to a frequency modulator 57. The frequency modulator includes a source for generating a carrier, the frequency of which is to be modulated. The output of the frequency modulator 57 is fed through a high pass filter 58 to a mixing circuit 59.

The input terminal 53 is also connected to a comb filter 61 which separates out the chrominance signal components of the composite video signal and passes such signal components to a signal processor in the form of a balanced modulator 62 having an oscillator 63 connected thereto for frequency converting the chrominance signal components. The modulator 62 has two output terminals connected to the fixed terminals of a single-pole, double-throw switch or selecting device 64 and the arm of this switch is connected to a low pass filter 65 which is connected in turn to the mixing circuit 59.

The composite video signal is also supplied from the input terminal 53 to a horizontal sync separator 66 and to a vertical sync separator 67. The horizontal sync separator 66 is connected to a flip-flop 68 and the vertical sync separator 67 is connected to a divider 69. The divider 69 is operative to provide control signals at a repetition rate which is a predetermined fraction $1/(2 \times n)$ of the repetition rate of the separated vertical synchronizing signals, in which n is the number of field intervals to be recorded in each of the tracks. In the case where 1 field interval is recorded in each of the tracks, the repetition rate of the control signals issuing from divider 69 is ½ the repetition rate of the vertical synchronizing signals and the divider 69 may be constituted by a flip- flop. Of course, the number n may be less than 1, for example, one-half field interval may be recorded in each of the tracks, in which case the repetition rate of the control signals is equal to the repetition rate of the vertical synchronizing signals. In all cases, it will be seen that the control signals issuing from divider 69 occur in correspondence with the recording of video signals in alternating or every other one of the tracks so as to identify or distinguish between the tracks in which chrominance signal components are recorded with the different carriers, as herinafter described in detail.

On FIG. 3, the record medium 21 is shown to be in the form of a magnetic tape which is wrapped helically part of the way around a drum 70. This drum comprises an upper portion 71 and a lower portion 72 with a slot 73 therebetween. Two transducers 74 and 75 are located at opposite ends of an arm 76 affixed to the end of a shaft 77 driven by a motor 78 through a belt and pulley drive 79. An amplifier 80 connects the mixing circuit 59 to the transducers 74 and 75 which project through the slot 73 and, in moving in a circular path, alternately move across the magnetic tape 21 in the direction of the arrow 24 on FIG. 1 while the tape is longitudinally advanced in the direction of the arrow 26. Thus, the video signals received from amplifier 80 by transducers 74 and 75 are alternately recorded by the latter in the successive parallel tracks 22, 23, 22a, 23a, 22b, 23b...etc. which extend obliquely across the tape 21, for example, with the transducer 74 recording in the tracks 22, 22a, 22b...etc., and the transducer 75 recording in the tracks 23, 23a, 23b...etc.

The control signals from divider 69 are applied through an amplifier 81 to a fixed transducer 82 which is located adjacent the path of magnetic tape 21 for recording the control signals at spaced apart locations along a longitudinal edge of the tape, for example, as indicated at 83 on FIG. 1. Since the control signals have a repetition rate equal to onehalf the repetition rate of the field intervals and the video signal for one field interval is recorded in each of the tracks, it is apparent that the recorded control signals 83 will be in predetermined positional relationship to every other one of the tracks, for example, the tracks 22, 22a, 22b,...etc., as shown.

The control signals from divider 69 are also employed in a servo-system for regulating the movements of transducers 74 and 75 relative to tape 21. As shown, such servo-system comprises pulse generating means 84 for producing pulse signals upon the operative positioning of each of transducers 74 and 75 relative to tape 21, for example, as each of the transducers begins to scan a respective track on the tape. The pulse generating means 84 may include a magnet 85 fixed on shaft 77, and a pair of diametrically opposed transducers or coils 86 and 87 located along the circular path of movement of magnet 85, as shown. Thus, as transducer 74 commences to move along a track on tape 21, magnet 85 passes coil 86 and causes the latter to emit a pulse signal. Similarly, coil 87 emits a pulse signal as transducer 75 commences to move along a track on tape 21. Every other one of the pulse signals from pulse generating means 84, for example, the pulse signals from coil or pulse generator 86, are applied to a phase comparator circuit 88 which also recieves the control signals from divider 69. The comparator circuit 88 compares the phases of the control signals and of the pulse signals from coil or pulse generator 86 and provides a corresponding brake control or regulating signal which controls a brake 89 on shaft 77. Thus, the brake 89 more or less resists turning of shaft 77 for either decreasing or increasing the speed of movement of transducers 74 and 75 so that each of the latter will commence its movement along a respective record track on tape 21 at the commencement of a field interval of the video signals being recorded.

The pulse signals from transducers or coils 86 and 87 are applied to the set and reset terminals, respectively, of a flip-flop 90 and the output of the latter is applied to an AND circuit or gate 91 which also receives the output of flip-flop 68. The output of AND circuit or gate 91 is connected to switching or selecting circuit 64 for controlling the latter. It will be seen that flip-flop 68 produces first switch control signals for periods corresponding to every other one of the line intervals, while flip-flop 90 produces second switch control signals for periods corresponding to every other one of the field intervals, that is, each switch control signal from flip-flop 90 is initiated by a pulse signal from coil or generator 86 and is terminated by the next pulse signal from the other coil or generator 87.

In the operation of the apparatus shown in FIG. 3, the oscillator 63 generates a signal having a fixed frequency $f_c$ and this signal combines, in the balanced modulator 62, with the chrominance signal components that pass through the comb filter 61 to the balanced modulator. The balanced modulator 62, which is arranged to subtract the frequencies of the signals supplied thereto, produces two output signals indicated as $C_a$ and $-C_a$ which are, as the minus sign indicates, of opposite polarity, although they may be considered to be 180° out of phase. Each of these signals, when considered instantaneously, has the same carrier frequency $f_a$ substantially below that of the frequency modulated luminance signal, and they are selected alternately by the switching circuit 64 to be applied to the low pass filter 65 that eliminates undesired side bands and applies only the proper frequency converted chrominance component signal to the mixing circuit 59.

The operation of the switching circuit 64 to select either signal $C_a$ or signal $-C_a$ is controlled by the AND gate 91 in response to the output or switch control signals from the flip-flops 68 and 90. The selected pattern of recording of the signals $C_a$ and $-C_a$ is illustrated on FIG. 1, in which each of the line areas 27, 29 and 31 in track 22 and each of the line areas 28, 30 and 32 in track 23 has two arrows in it, with the larger arrow in each case indicating the polarity of the carrier of the frequency converted chrominance component recorded therein, and the smaller arrow indicating the polarity of the carrier of the cross-talk interference signal, which is the frequency converted chrominance signal components in the next adjacent line area of the adjacent track.

Examination of track 22 indicates that all of the frequency converted chrominance component signals recorded therein have a carrier of the same polarity. This may be either the polarity of the signal $C_a$ or of the signal $-C_a$. For the sake of simplifying the explanation it will be assumed that the polarity of the larger arrows in the track 22 indicates that the signal $C_a$ is recorded in all of the line increments 27, 29 and 31. In the track 23 the polarity of the carrier is reversed in alternate line areas or increments, that is, in line areas 28 and 32, the signal $C_a$ is recorded and in line area 30 the signal $-C_a$ is recorded.

Figure 4:
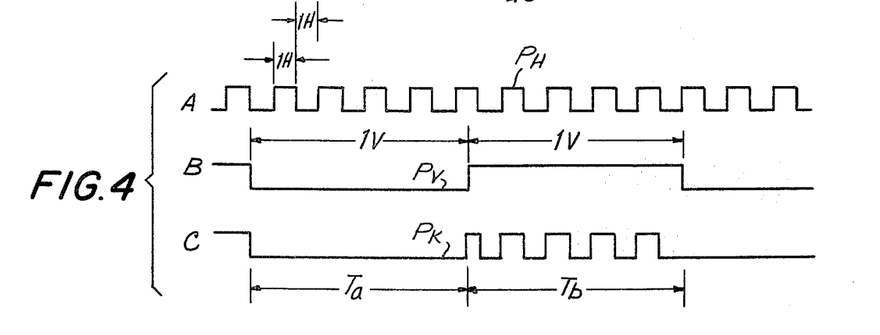
FIG. 4 shows a set of waveforms to which reference will be made in explaining the operation of the apparatus of FIG. 2.

In order to record the signals $C_a$ and $-C_a$ in the pattern shown on FIG. 1, the simple logic circuit involving AND gate 91 is used. Line A of FIG. 4 shows the output signal $P_h$ of the flip-flop 68 as being a square wave having high and low intervals, each equal to one line interval, or lH. One complete cycle of the signal in line A of FIG. 4 thus has a fundamental frequency $\frac{1}{2}(f_h)$. The output signal of the flip-flop 90 is shown in line B of FIG. 4 as a square wave $P_v$ having high and low intervals each equal to lV, where V is a field interval.

Since the AND gate 91 can produce a high output only when both of the applied signals $P_h$ and $P_v$ are high, the output of the AND gate, as is shown in line C of FIG. 4, remains low during one entire field interval $T_a$ and goes high only during alternate line intervals of the alternate field interval $T_b$. The pattern shown on FIG. 1 corresponds to having the arm of the switching circuit 64 apply the signal $C_a$ to the low pass filter 65 when the output of the AND gate 91 is low and having the arm apply the signal $-C_a$ to the low pass filter 65 when the output of AND gate 91 is high.

Figure 5:
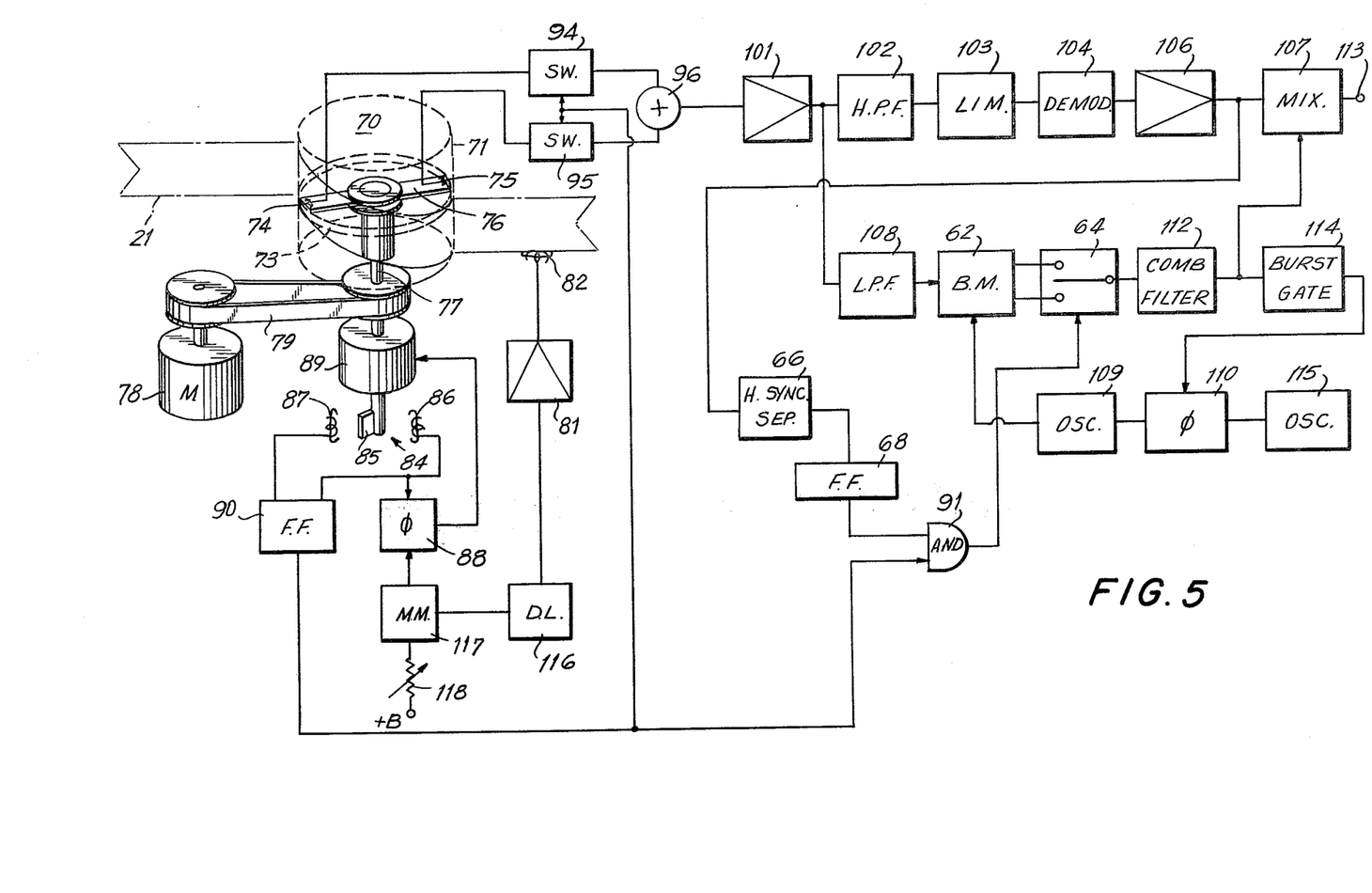
FIG. 5 is a block diagram of a reproducing or playback apparatus for reproducing video signals recorded by the apparatus of FIG. 2; and, FIGS. 6A and 6B schematically illustrate transducers that are preferably employed in the apparatus of FIGS. 2 and 4.

FIG. 5 shows a playback apparatus for reproducing video signals recorded by the apparatus of FIG. 3. Many of the components in FIG. 5 are identical with those in FIG. 3 and are identified by the same reference numerals. Among these components are the transducers 74 and 75, which are operated as playback transducers in FIG. 5 and are connected through alternately closed switches 94 and 95 and an adding or combining circuit 96 to the input of an amplifier 101. The output of this amplifier is connected through a high pass filter 102 to a limiter 103 that supplies an amplitude-limited signal to a frequency demodulator 104. The demodulator is connected to another amplifier 106 that supplies a signal to a mixing circuit 107.

The amplifier 101 is also connected to a low pass filter 108 which separates the frequency converted chrominance signal from the reproduced video signals. The reproduced frequency converted chrominance signal separated by low pass filter 108 and made up, alternatively, of the signals $C_a$ and $C_b$ is applied to a balanced modulator 62 along with a signal from an oscillator 109. The signal from oscillator 109 has a frequency $f_s+f_a$ which is maintained constant during all line and field intervals, and in which $f_s$ is the original or standard chrominance carrier frequency and $f_a$ is the frequency of the carriers of signals $C_a$ and $C_b$, so that the reproduced chrominance signal components are reconverted to their original carrier frequency $f_s$ in balanced modulator 62. A phase comparator circuit 110 is connected to oscillator 109 which is voltage controlled by a control signal from circuit 110 to regulate the frequency of the outputs from oscillator 109. As before, the balanced modulator 62 has two output terminals which are connected to respective input terminals of the switching or selecting device 64. The output of switching or selecting device 64 is connected to a comb filter 112 which, as hereinafter described, cancels or suppresses the chrominance components of the cross-talk signals so that only the chrominance signal components of the video signals being reproduced from a particular track are passed to mixing circuit 107 to be combined in the latter with the demodulated luminance signal for forming the desired composite video signals applied to an output terminal 113. The output of comb filter 112 is also connected to a burst gate 114 which extracts burst signals from the reconverted chrominance signal components and applies the extracted burst signals to one input of comparator circuit 110. An oscillator 115 provides an output at the standard frequency $f_2$ which is applied to a second input of comparator circuit 110, and the latter suitably adjusts the output of voltage controlled oscillator 109 in the event of any phase deviation between the extracted burst signals and the output of standard oscillator 115.

In order to control the operation of switching or selecting circuit 64, the horizontal sync separator 66 is connected to the output of amplifier 106 for separating horizontal synchronizing signals from the demodulated luminance signal, and the separated horizontal synchronizing signals are applied to the flip-flop 68 so that the latter produces first switch control signals for periods corresponding to every other one of the line intervals. Such first switch control signals are applied to one input of the AND circuit of gate 91, and the other input of AND gate 91 receives the second switch control signals from flip-flop 90. As in the recording apparatus or mode of operation illustrated on FIG. 3, the set and reset terminals of the flip-flop 90 in the reproducing apparatus or mode of operation receive the pulse signals from the transducers or coils 86 and 87, respectively, of pulse generating means 84 so that the second switch control signals correspond to every other field interval, that is, each second switch control signal from fli-flop 90 is initiated by a pulse signal from coil 86 and is terminated by the next pulse signal from the other coil 87. The output signal of AND gate 91, which occurs or is high only during the concurrent existence of the first and second switch control signals from flip-flops 68 and 90, is applied to switching or selecting circuit 64 for controlling the operation of the latter.

The second switch control signals from flip-flop 90 are further employed to control switches 94 and 95 alternately so that, even though there is normally some overlap of the signals reproduced by transducers 74 and 75, such overlap is eliminated in the reproduced video signals combined in adding circuit 96.

In the reproducing apparatus or mode of operation shown on FIG. 5, the fixed transducer 82 reproduces the recorded control signals 83 which distinguish the tracks 22, 22a, 22b,...etc. having the chrominance signal components recorded therein with one carrier from the tracks 23, 23a, 23b ...etc. having the chrominance signal components recorded therein with the other carrier. The reproduced control signals are applied through the amplifier 81 and a suitable delay line 116 to a monostable multivibrator 117 which is provided with a variable resistor 118 for varying its time constant, that is, the duration of its output signal initiated by each of the reproduced control signals. The output signals from monostable multivibrator 117 are applied to one input of phase comparator circuit 88 which, at its other input, receives the pulse signals from coil or generator 86, and which controls the brake 89 on the basis of a phase comparison of its two inputs. It will be apparent that, by reason of the described arrangement, the rotation of transducers 74 and 75 will be controlled so that such transducers will only reproduce video signals recorded with the chrominance signal components thereof having the different carriers, respectively. For example, in the arrangement described, transducer 74 reproduces video signals recorded in tracks 22, 22a, 22b...etc., while transducer 75 reproduces video signals recorded in tracks 23, 23a, 23b...etc.

The operation of the apparatus shown in FIG. 5, insofar as the chrominance component signal is concerned, consists in applying the signal having the frequency $f_s+f_a$ from the oscillator 109 to the balanced modulator 62 to convert the frequency $f_a$ of the signals $C_a$ and $C_b$ which are applied alternatively to the balanced modulator back to the original chrominance carrier frequency $f_s$. The two output terminals of the balanced modulator 62 provide signals of opposite polarity. One of them includes the desired signals $C_s$ and the undesired or cross-talk signal $C_{sb}$, while the other includes the desired signal $-C_s$ and the undesired or cross-talk signal $-C_{sb}$. The switching or selecting circuit 64 is controlled by the output of AND gate 91 to produce exactly the same switching pattern as was previously described with reference to FIG. 4C.

The output of switching circuit 64 is applied to comb filter 112 which includes both a direct signal path and a path in which the signal is delayed by one horizontal line interval. Thus, when the chrominance component signals of the track 22 on FIG. 1 are being reproduced, the desired chrominance component signals in two successive line areas 27 and 29 or 29 and 31 are combined, with the polarities of their carriers being the same, at the output of the comb filter. However, the undesired or cross-talk components, indicated by the small arrows in the line increments, have carriers of opposite polarities in successive pairs of lines, and thus cancel each other when combined at the output of the comb filter 112. As a result, the output signal of comb filter 112 in FIG. 5 during the reproduction of the track 22 consists substantially only of the desired chrominance components $C_s$ having the proper carrier frequency $f_s$. During the reproduction of the track 22, the switching circuit 64 does not switch back and forth between its two input terminals but remains on only one terminal as indicated during the interval $T_a$ in FIG. 4C.

During reproduction of the track 23, switching circuit 64 does switch back and forth at the end of each line interval of time in accordance with the output signal of AND gate 91 during the interval $T_b$ as indicated in FIG. 4C. Thus, the comb filter 112 receives the signals $C_s$ and $c_{sb}$, during one line interval, for example, corresponding to the line area 28, and the signals $-C_s$ and $-C_{sb}$ during the next succeeding line interval, for example, corresponding to the line area 30. This is the equivalent of inverting the signal received during the line interval that corresponds to the line area 30. Since the chrominance signal components recorded in line areas 28 and 30 have carriers with reversed polarities, respectively, such inverting of the signal reproduced from line area 30 causes the chrominance components signal reproduced from line area 30 to be combined, in phase, at the output of comb filter 112 with the delayed chrominance component signal reproduced from line area 22. However, since the chrominance component signals are recorded in all line areas of the next adjacent track 22 with carriers of the same polarity, the cross-talk signals from track 22 which are reproduced with the chrominance component signals recorded in the successive line areas of the track 23 also have carriers of the same polarity. Therefore, the above mentioned inverting of the signal reproduced from line area 30 of track 23 causes the cross-talk signal reproduced with the signal recorded in line area 30 to be combined, with its phase or polarity reversed, with the delayed cross-talk signal reproduced with the signal recorded in line area 28, whereby the combined cross-talk signals cancel each other at the output of comb filter 112.

Although in the embodiment of the invention described above with reference to FIGS. 3 and 5 it has been indicated that the comb filter 112 achieves suppression or elimination of cross-talk interference primarily by reason of the different polarity characteristics of the carriers with which the chrominance components signals are recorded in adjacent tracks, for example, the tracks 22 and 23 on FIG. 1, it is to be understood that the invention may be similarly applied to apparatus in which the comb filter 112 achieves suppression or elimination of cross-talk interference in respect to the chrominance signal components by reason of the different frequency characteristics of the carriers with which the chrominance components signals are recorded in adjacent tracks, for example, as disclosed specifically in the previously identified U.S. Pat. Application Ser. No. 492,330 and in the continuation thereof filed Nov. 24, 1975.

Figure 6A:
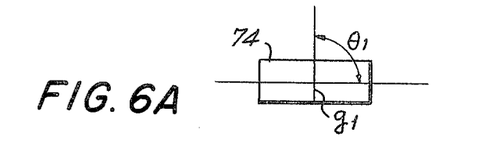
Figure 6B:
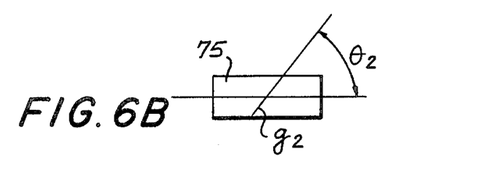

Further, as shown on FIGS. 6A and 6B, the transducers 74 and 75 preferably have gaps $g_1$ and $g_2$ with different azimuth angles $\Theta_1$ and $\Theta_2$, respectively. As shown, such azimuth angles $\Theta_1$ and $\Theta_2$ may be 90° and 60°, respectively, so as to effectively suppress or eliminate cross-talk interference in respect to the luminance signal component of the video signals recorded in adjacent tracks, as previously described.

A possible modification of the apparatus according to this invention, as described above, involves the changes necessary to record a television signal produced according to the PAL system. As is known, the chrominance carrier in the PAL system is offset from one of the high harmonics of the line frequency $f_h$ by only ¼($f_h$) instead of ½($f_h$), as in the NTSC system. Thus, in the apparatus of FIGS. 3 and 5, the pulsing signal applied during the interval $T_b$ must have a repetition rate of ¼($f_h$). This corresponds to recording two line intervals in one polarity and the succeeding two line intervals in the opposite polarity, and is consistent with the fact that the carrier of one of the chrominance components in a PAL television signal is inverted in alternate line intervals.

As previously mentioned, the invention is also capable of being used with a recording system in which one field interval is broken up to be recorded on more than one track or in which an entire frame interval may be recorded on a single track.

Although particular embodiments of the invention have been described in detail herein with reference to the accompanying drawings, it is to be understood that the invention is not limited to those precise embodiments, and that various changes and modifications, in addition to those specifically referred to above, may be effected by one skilled in the art without departing from the scope or spirit of the invention as defined in the appended claims.

What is claimed is:

1. In apparatus for recording video signals having luminance and chrominance signal components and being comprised of field intervals and line intervals recorded in respective areas of successive parallel tracks on a record medium: the combination of a plurality of transducers which are movable with respect to the record medium so as to be successively operatively positioned relative to said record medium in a repeating cyclic order for recording the video signals in said successive tracks, respectively; pulse signal generating means for producing pulse signals upon the operative positioning of each of said transducers; means for providing different first and second carriers for said chrominance signal components; carrier selecting means for alternatively selecting said first and second carriers for said chrominance signal components to be recorded in said tracks; control means for said carrier selecting means operative in response to every other one of said pulse signals to cause the recording to said chrominance signal components with said first and second carriers, respectively, in tracks which are adjacent each other; means for separating vertical synchronizing signals from the video signals being recorded; means receiving the separated vertical synchronizing signals for producing control signals at a repetition rate which is a fraction of the repetition rate of said vertical synchronizing signals, said fraction being 1/(2 x n) in which n is the number of said field intervals to be recorded in each of said tracks; means for recording said control signals on the record medium in predetermined positional relation to said tracks so as to distinguish the tracks in which the chrominance signal components are recorded with said first and second carriers, respectively; and means for regulating the movement of said transducers in dependence on a comparison of said every other one of said pulse signals with said control signals.

2. An apparatus according to claim 1; in which said record tracks are arranged on the record medium without guard bands therebetween.

3. An apparatus according to claim 1; in which said transducers are driven in a circular path for said movement relative to the record medium; and said means for regulating the movement of said transducers includes brake means for variably braking said movement of the transducers in said circular path, and phase comparing means receiving said control signals and said every other one of said pulse signals for signal in said braking signalin accordance with the phase comparison thereof.

4. An apparatus according to claim 1; in which said transducers consist of first and second transducers which are alternately operatively positioned for recording the chrominance components of said video signals with said first and second carriers, respectively, said number n=1, and said pulse signal generating means includes first and second pulse generators which respectively produce first and second pulse signals upon the operative positioning of said first and second transducers, respectively; and in which said means for regulating said movement of the transducers includes means for comparing the phases of said first pulse signals and said control signals, respectively.

5. An apparatus according to claim 4; further comprising means for frequency modulating said luminance signal component on a carrier prior to the recording of said video signals on the record medium; and in which said record medium is magnetic, said first and second carriers for the chrominance signal components have frequencies below the band of frequencies of the frequency modulated luminance signal component, and said first and second transducers are magnetic and have gaps with substantially different azimuth angles.

6. An apparatus according to claim 4; in which the polarity of said first carrier is constant during successive line intervals of the video signals being recorded in one of said adjacent tracks, and the polarity of said second carrier is reversed after every predetermined number of line intervals of the video signals being recorded in the other of said adjacent tracks.

7. An apparatus according to claim 6; in which said means for providing said first and second carriers includes signal processing means receiving said chrominance signal components and having first and second output conditions of reversed polarity, said carrier selecting means includes switching means having first and second conditions for alternatively establishing said first and second output conditions of said signal procession means for recording on said record medium, and said control means actuates said switching means so that the latter continuously establishes said first output condition during recording of the video signals in said one of the adjacent tracks and establishes said first and second output conditions alternately, during successive line intervals of recording in said other of the adjacent tracks.

8. An apparatus according to claim 7; in which said control means includes separating means for separating horizontal synchronizing signals from the video signals being recorded, means operated by the separated horizontal synchronizing signals for producing first switch control signals for periods corresponding to every other one of said line intervals, means operated by said first and second pulse signals for producing second switch control signals for periods initiated by said second pulse signals and each having the duration of a field interval, and means receiving said first and second switch control signals for normally establishing said first condition of the switching means and for establishign said second condition of the switching means in response to concurrence of said first and second switch control signals.

9. In apparatus for recording and reproducing video signals having luminance and chrominance signal components and being comprised of field intervals and line intervals which are recorded in respective areas of successive parallel record tracks on a record medium: the combination of a plurality of transducers which are movable with respect to the record medium so as to be successively operatively positioned relative to said record medium for selectively recording and reproducing the video signals in said successive tracks, respectively; pulse signal generating means for producing pulse signals upon the operative positioning of each of said transducers; recording circuit means operative in the recording mode of said transducers and comprising means for providing different first and second carriers for the chrominance signal components, carrier selecting means for alternatively selecting said first and second carriers for said chrominance signal components to be recorded in said record tracks, control means for said carrier selecting means operative in response to every other one of said pulse signals to cause the recording of said chrominance signal components with said first and second carriers, respectively, in tracks which are adjacent each other, means for separating vertical synchronizing signals from the video signals being recorded, means receiving the separated vertical synchronizing signals for producing control signals at a repetition rate which is a fraction of the repetition rate of said vertical synchronizing signals, said fraction being $1/(2 \times n)$ in which n is the number of said field intervals to be recorded in each of said tracks, and means for recording said control signals on the record medium in predetermined positional relation to said tracks so as to distinguish the tracks in which the chrominance signal components are recorded with said first and second carriers, respectively; reproducing circuit means operative in the reproducing mode of said transducers in which the latter succesively reproduce video signals recorded in each of said tracks along with crosstalk signals from tracks adjacent thereto, means for separating said chrominance signal components from the luminance signal component in the reproduce signals, means for providing the separated chrominance signal components of video signals reproduced from each of said tracks with a common carrier and for eliminating therefrom the chrominance signal components of the cross-talk signals on the basis of said different first and second carriers with which the chrominance signal components are recorded in the tracks which are adjacent to each other, and means for reproducing said control signals recorded on the record medium; and means for regulating the movement of said transducers in said recording and reproducing modes thereof in dependence on a comparison of said every other one of said pulse signals with said control signals being recorded and reproduced, respectively.

10. An apparatus according to claim 9; in which said record tracks are arranged on the record medium without guard bands therebetween.

11. An apparatus according to claim 9; in which said transducers are driven in a circular path for said movement relative to the record medium; and said means for regulating the movement of said transducers includes brake means for variably braking said movement of the transducers in said circular path, and phase comparing means receiving said control signals as recorded and reproduced and said every other one of said pulse signals for varying said braking in accordance with the phase comparison thereof.

12. An apparatus according to claim 9; in which said transducers consist of first and second transducers which are alternately operatively positioned for selectively recording and reproducing the chrominance components of said video signals with said first and second carriers, respectively, said number n=1, and said pulse signal generating means includes first and second pulse generators which respectively produce first and second pulse signals upon the operative positioning of said first and second transducers, respectively; and in which said means for regulating said movement of the transducers includes means for comparing the phases of said first pulse signals and of said control signals as recorded and reproduced.

13. An apparatus according to claim 12; in which said record medium is magnetic, and said first and second transducers are magnetic and have gaps with substantially different azimuth angles; said recording circuit means further comprises means for frequency modulating said luminance signal component on a carrier prior to the recording of said video signals on the record medium by said transducers; said first and second carriers for the chrominance signal components have frequencies below the band of frequencies of the frequency modulated luminance signal component; and said reproducing circuit means further comprises means for frequency demodulating the luminance signal component separated from the chrominance signal components in the reproduced video signals.

14. An apparatus according to claim 12; in which said first and second carriers have different polarity characteristics with the polarity of said first carrier being constant and the polarity of said second carrier being reversed after every predetermined number of line intervals of the video signals recorded with said second carrier; and in which said means for providing the separated chrominance signal components with a common carrier and for eliminating therefrom the chrominance signal components of the cross-talk signals includes processing means for the chrominance signal components of the reproduced signals having a first output condition in which processed signals are derived with the polarities of their carriers as recorded and a second output condition in which the processed signals are inverted, comb filter means having a delay period equal to one of said line intervals and receiving said processed signals, and switching means for continuously establishing said first output condition of the processing means during the reproducing of video signals having the chrominance signal components recorded with said first carrier and for alternately establishing said first and second output conditions of the processing means after said predetermined number of line intervals during the reproducing of video signals having the chrominance signal components thereof recorded with said second carrier.

15. An apparatus according to claim 14; in which said switching means has first and second conditions corresponding to said first and second output conditions, respectively, of said processing means; and in which said reproducing circuit means further comprises means for separating horizontal synchronizing signals from said luminance signal component in the reproduced signals, means operated by the separated horizontal synchronizing signals for producing first switch control signals for periods corresponding to every other one of said line intervals, means operated by said first and second pulse signals for producing second switch control signals for periods initiated by said second pulse signals and each having the duration of a field interval, and means receiving said first and second switch control signals for normally establishing said first condition of the switching means and for establishing said second condition of the switching means in response to concurrence of said first and second switch control signals.

16. An apparatus according to claim 12; in which the polarity of said first carrier is constant during successive line intervals of the video signals being recorded in one of said adjacent tracks, and the polarity of said second carrier is reversed after every predetermined number of line intervals of the video signals being recorded in the other of said adjacent tracks.

17. An apparatus according to claim 16; in which said means for providing said first and second carriers includes signal processing means receiving said chrominance signal components and having first and second output conditions of reversed polarity, said carrier selecting means includes switching means having first and second conditions for alternatively establishing said first and second output conditions of said signal processing means for recording on said record medium, and said control means actuates said switching means so that the latter continuously establishes said first output condition during recording of the video signals in said one of the adjacent tracks and establishes said first and second output conditions alternately, during successive line intervals of recording in said other of the adjacent tracks.

18. An apparatus according to claim 17; in which said control means includes separating means for separating horizontal synchronizing signals from the video signals being recorded, means operated by the separated horizontal synchronizing signals for producing first switch control signals for periods corresponding to every other one of said line intervals, means operated by said first and second pulse signals for producing second switch control signals for period initiated by said second pulse signals and each having the duration of a field interval, and means receiving said first and second switch control signals for normally establishing said first condition of the switching means and for establishing said second condition of the switching means in response to concurrence of said first and second switch control signals.

19. In an apparatus for reproducing video signals having luminance and chrominance signal components and comprised of field intervals and line intervals which are recorded in respective areas of successive parallel tracks on a record medium with said chrominance signal components of video signals recorded in adjacent tracks having different first and second carriers and with control signals being recorded on the record medium in predetermined positional relation to said tracks so as to distinguish the tracks in which the chrominance signal components are recorded with said first and second carriers, respectively: the combination of a plurality of transducers which are movable with respect to the record medium so as to be successively operatively positioned relative to said record medium for reproducing the video signals recorded in each of said tracks along with cross-talk signals from the tracks adjacent thereto, pulse signal generating means for producing pulse signals upon the operative positioning of each of said transducers, means for separating said chrominance signal components from the luminance signal component in the reproduced signals, means for providing the separated chrominance signal components of video signals reproduced from each of said tracks with a common carrier and for eliminating therefrom the chrominance signal components of the cross-talk signals on the basis of said different first and second carriers with which the chrominance signal components are recorded in the tracks which are adjacent to each other, means for reproducing said control signals recorded on the record medium, and means for regulating the movement of said transducers in dependence on a comparison of every other one of said pulse signals with said control signals being reproduced.

20. An apparatus according to claim 19; in which said record tracks are arranged on the record medium without guard bands therebetween.

21. An apparatus according to claim 19; in which said transducers are driven in a circular path for said movement relative to the record medium; and said means for regulating the movement of said transducers includes brake means for variably braking said movement of the transducers in said circular path, and phase comparing means receiving said reproduced control signals and said every other one of said pulse signals for varying said braking in accordance with the phase comparison thereof.

22. An apparatus according to claim 19; in which said transducers consist of first and second transducers which are alternately operatively positioned for reproducing the chrominance components of said video signals with said first and second carriers, respectively, and said pulse signal generating means includes first and second pulse generators which respectively produce first and second pulse signals upon the operative positioning of said first and second transducers, respectively; and in which said means for regulating said movement of the transducers includes means for comparing the phases of said first pulse signals and of said reproduced control signals.

23. An apparatus according to claim 22; in which said record medium is magnetic, said first and second transducers are magnetic and have gaps with substantially different azimuth angles, said luminance component of the recorded video signals frequency modulates a carrier, and said first and second carriers for the chrominance signal components of the recorded signals have frequencies below the band of frequencies of the frequency modulated luminance signal component; and further comprising means for frequency demodulating the luminance signal component separated from the chrominance signal components in the reproduced video signals.

24. An apparatus according to claim 22; in which said first and second carriers have different polarity characteristics with the polarity of said first carrier being constant and the polarity of said second carrier being reversed after every predetermined number of line intervals of the video signals recorded with said second carrier; and in which said means for providing the separated chrominance signal components with a common carrier and for eliminating therefrom the chrominance signal components of the cross-talk signals includes processing means for the chrominance signal components of the reproduced signals having a first output condition in which processed signals are derived with the polarities of their carriers as recorded and a second output condition in which the processed signals are inverted, comb filter means having a delay period equal to one of said line intervals and receiving said processed signals, and switching means for continuously establishing said first output condition of the processing means during the reproducing of video signals having the chrominance signal components recorded with said first carrier and for alternately establishing said first and second output conditions of the processing means after said predetermined number of line intervals during the reproducing of video signals having the chrominance signal components thereof recorded with said second carrier.

25. An apparatus according to claim 24; in which said switching means has first and second conditions corresponding to said first and second output conditions, respectivey, of said processing means; and further comprising means for separating horizontal synchronizing signals from said luminance signal component in the reproduced signals, means operated by the separated horizontal synchronizing signals for producing first switch control signals for periods corresponding to every other one of said line intervals, means operated by said first and second pulse signals for producing second switch control signals for periods initiated by said second pulse signals and each having the duration of a field interval, and means receiving said first and second switch control signals for normally establishing said first condition of the switching means and for establishing said second condition of the switching means in response to concurrence of said first and second switch control signals.

* * * * *